United States Patent
Lin et al.

(10) Patent No.: US 11,255,410 B2
(45) Date of Patent: Feb. 22, 2022

(54) ADJUSTABLE TRANSMISSION GUY LINE CONNECTOR

(71) Applicant: MacLean Power, L.L.C., Fort Mill, SC (US)

(72) Inventors: Wei-Chung Lin, Birmingham, AL (US); Maxwell Goldsmith, Birmingham, AL (US); Jason McKenzie, Birmingham, AL (US)

(73) Assignee: MACLEAN POWER, L.L.C., Fort Mill, SC (US)

( * ) Notice: Subject to any disclaimer, the term of this patent is extended or adjusted under 35 U.S.C. 154(b) by 629 days.

(21) Appl. No.: 16/161,715

(22) Filed: Oct. 16, 2018

(65) Prior Publication Data

US 2020/0116232 A1 Apr. 16, 2020

(51) Int. Cl.
*F16G 11/04* (2006.01)
*F16G 11/12* (2006.01)

(52) U.S. Cl.
CPC .............. *F16G 11/04* (2013.01); *F16G 11/12* (2013.01)

(58) Field of Classification Search
CPC ........ F16G 11/048; F16G 11/12; F16G 11/04; F16G 11/106; Y10T 24/3969; H02G 7/056
See application file for complete search history.

(56) References Cited

U.S. PATENT DOCUMENTS

| | | | | |
|---|---|---|---|---|
| 3,098,275 A * | 7/1963 | Schweitzer | ........... | F16G 11/048 403/365 |
| 3,163,902 A * | 1/1965 | Bernburg | .............. | F16G 11/048 403/369 |
| 4,845,814 A * | 7/1989 | Crook | ................... | F16G 11/048 24/136 R |
| 6,173,103 B1 * | 1/2001 | France | ................. | G02B 6/4471 385/136 |
| 6,874,207 B2 * | 4/2005 | Goch | .................... | F16G 11/106 24/11 M |
| 2015/0200527 A1 * | 7/2015 | Shibilia | .................. | H02G 7/056 29/446 |

OTHER PUBLICATIONS

Chance Adjust-a-Grip Deadend Grips, Catalog 15, Jul. 2012, Hubbell Power Systems Inc., 12 pages.
Adjustable Wedge Grip for 5/8" EHS, Cat. No. ADJW5, May 22, 2014, 1 page.

* cited by examiner

*Primary Examiner* — Robert Sandy
(74) *Attorney, Agent, or Firm* — Brooks Kushman P.C.

(57) ABSTRACT

A connector is provided for tensioning a guy line and connecting the guy line to a ground anchor or a tower. The connector may include a first body and a second body connected together by two or more threaded rods. The first body is connected to the ground anchor or the tower. The second body has a tapered cavity extending therethrough. The guy line extends through the tapered cavity, and wedges with a first and second inner arcuate surface that are vertically offset from one another are pushed into the tapered cavity. The first arcuate inner surface and the second arcuate inner surface may grip the guy line after the wedges have been pushed into the tapered cavity, while the vertical offsetting of the second arcuate inner surface reduces that stress on the guy line at an end of wedges. The first and second bodies may be drawn toward each other to tension the guy line.

22 Claims, 21 Drawing Sheets

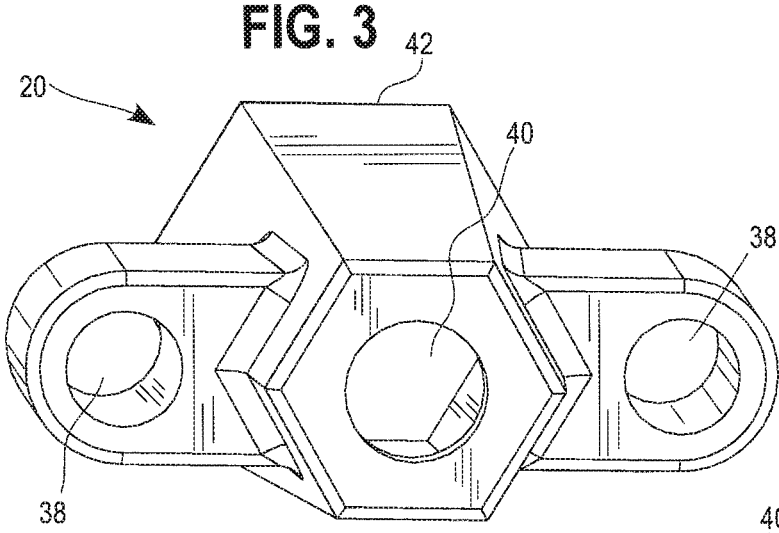
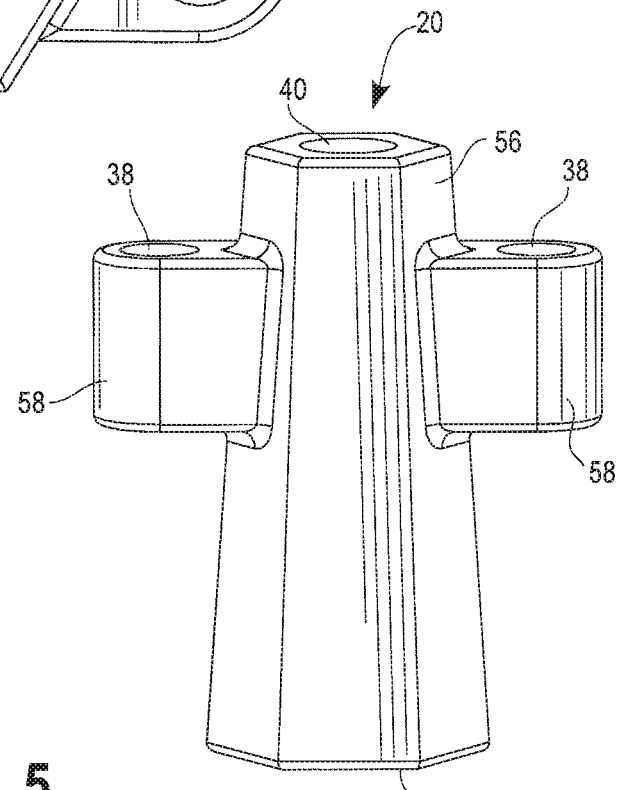
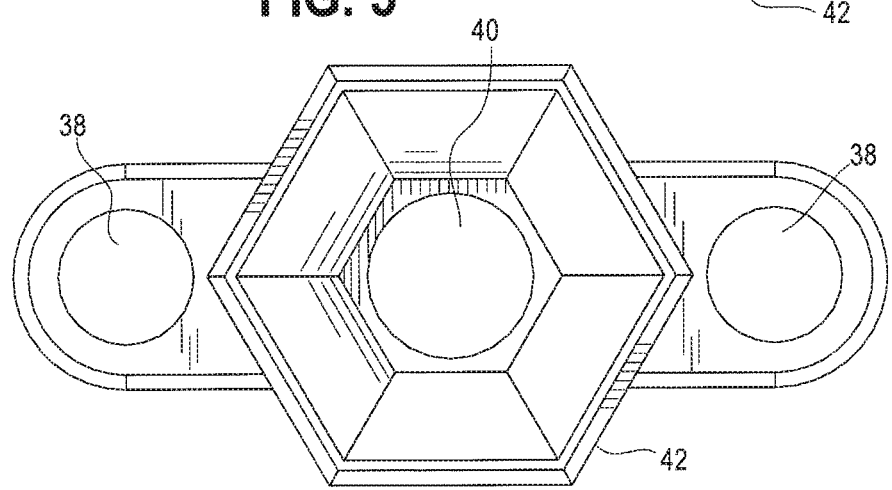

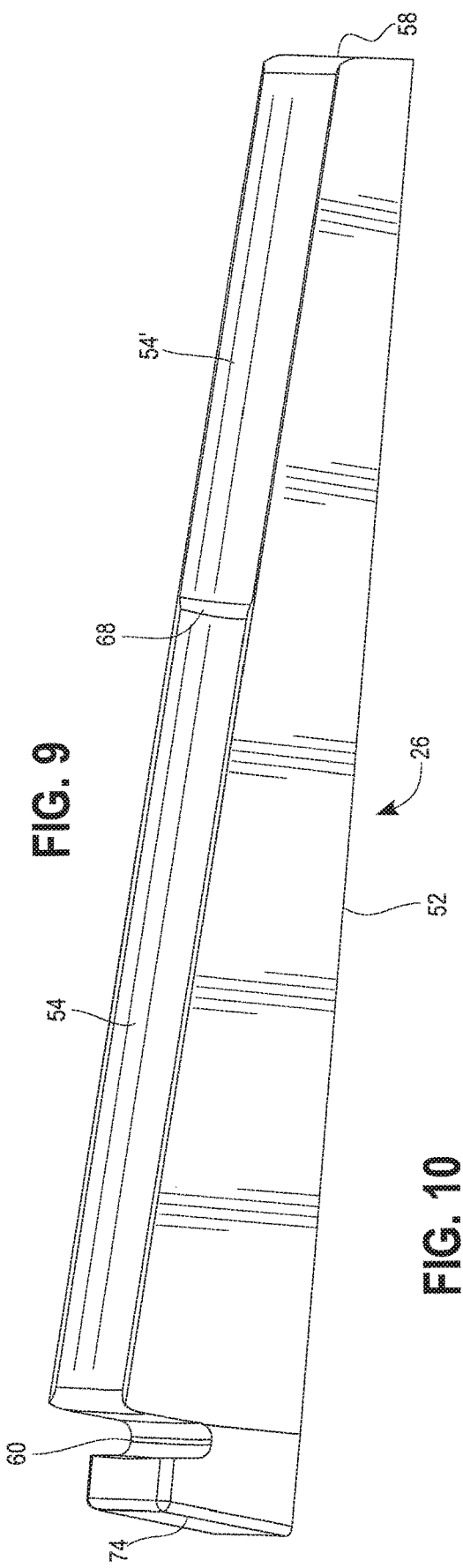
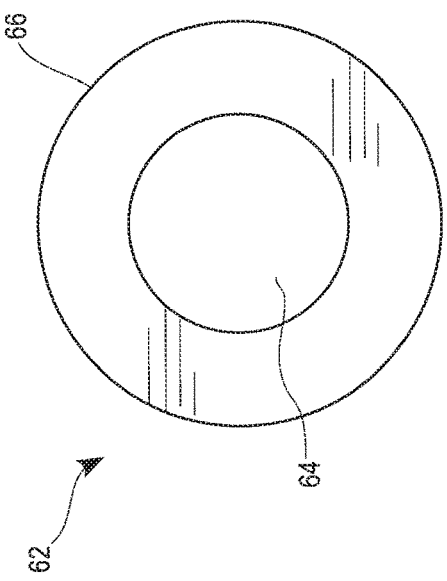

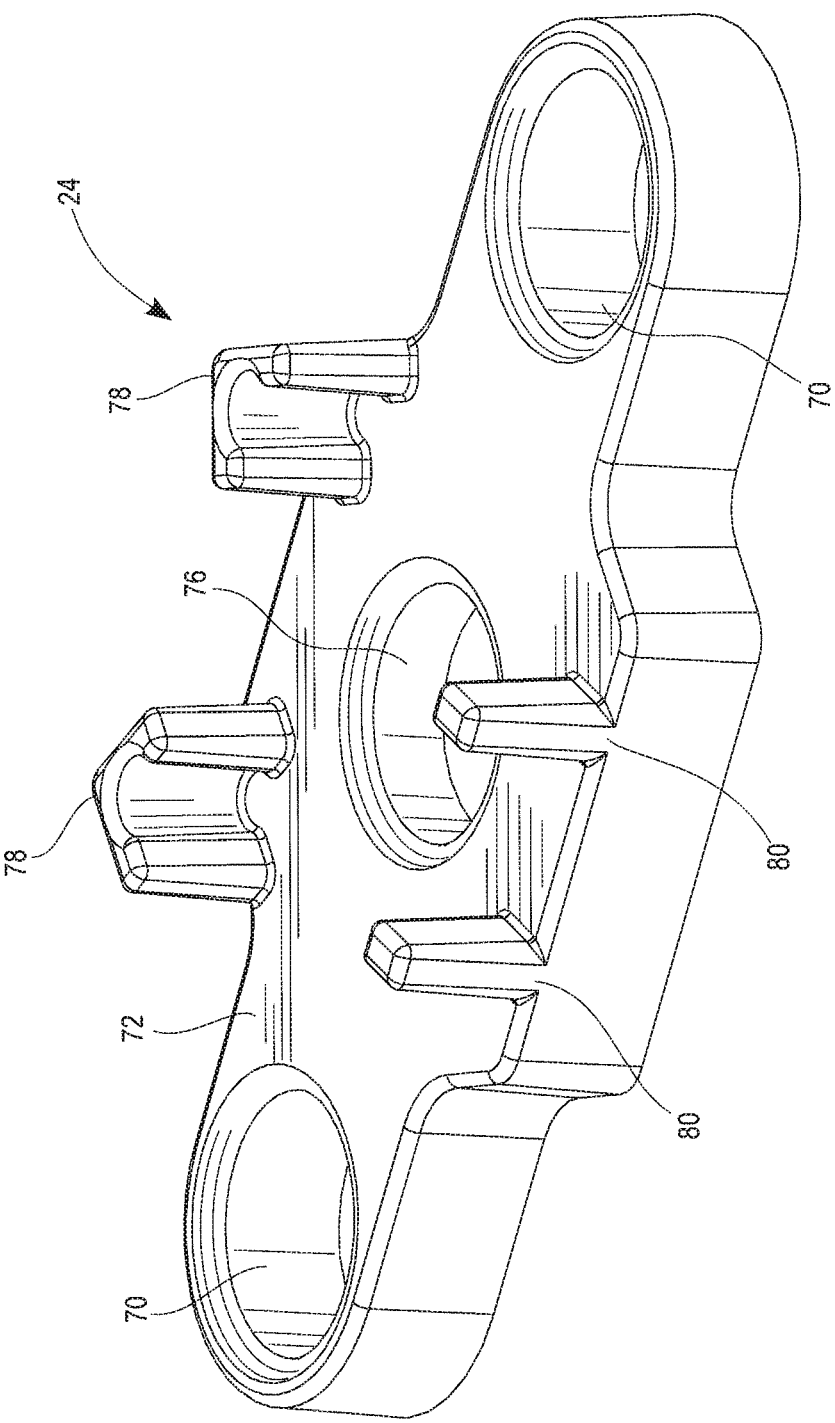

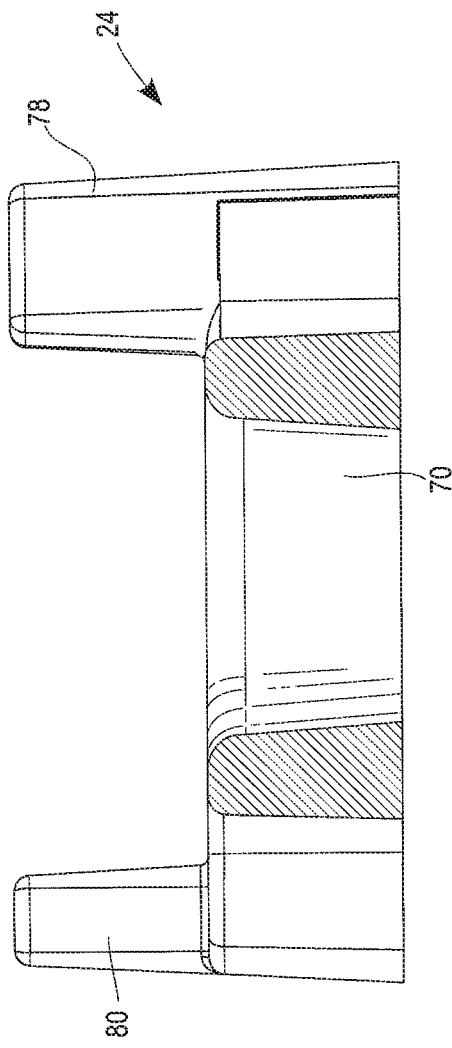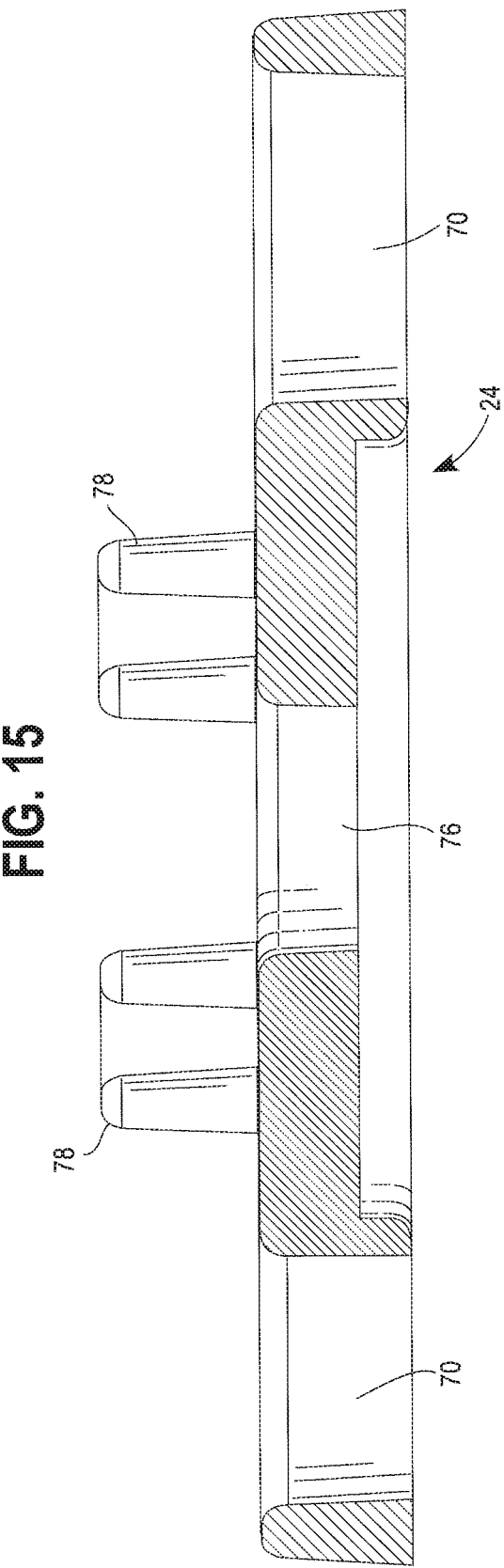

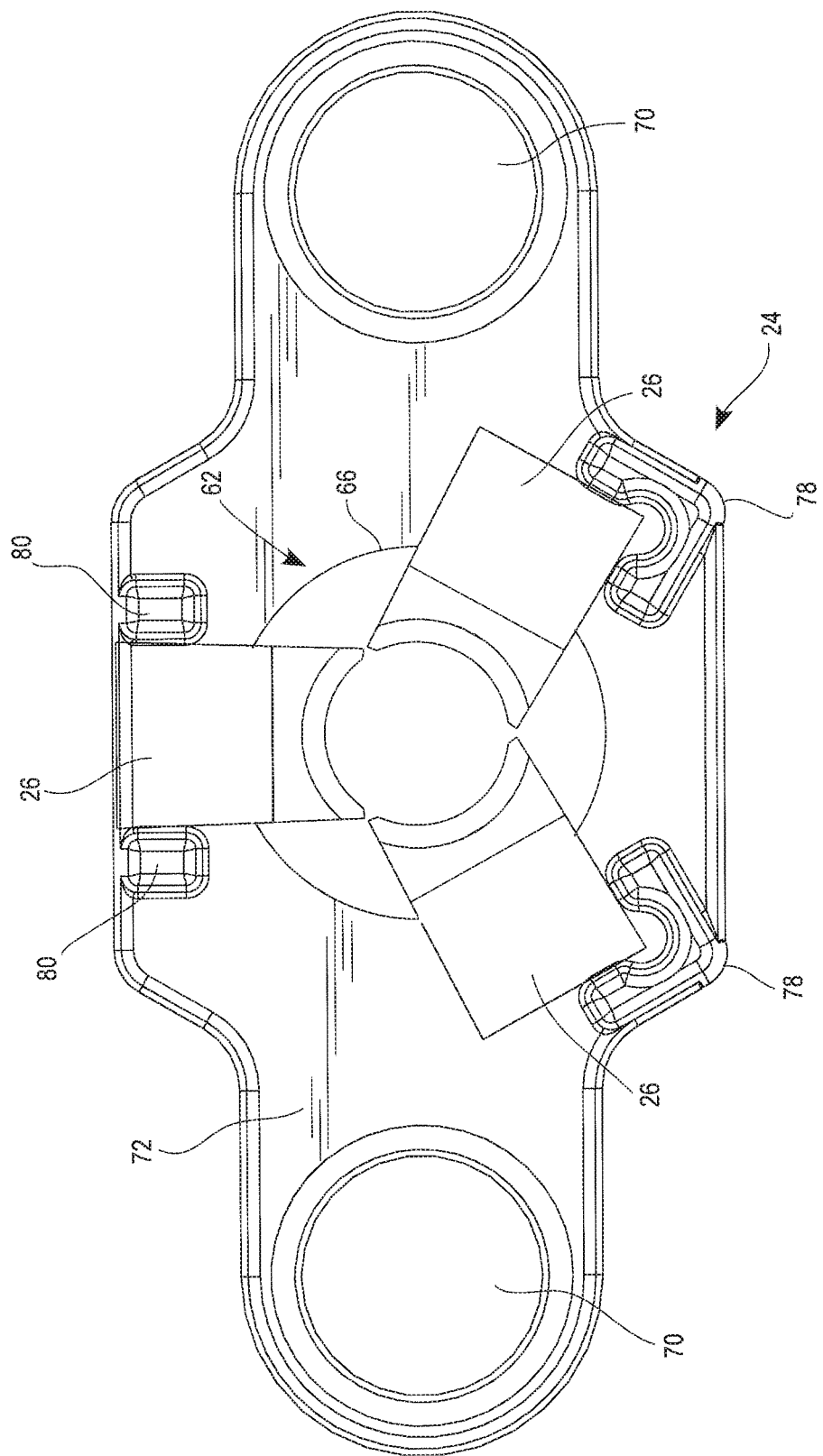

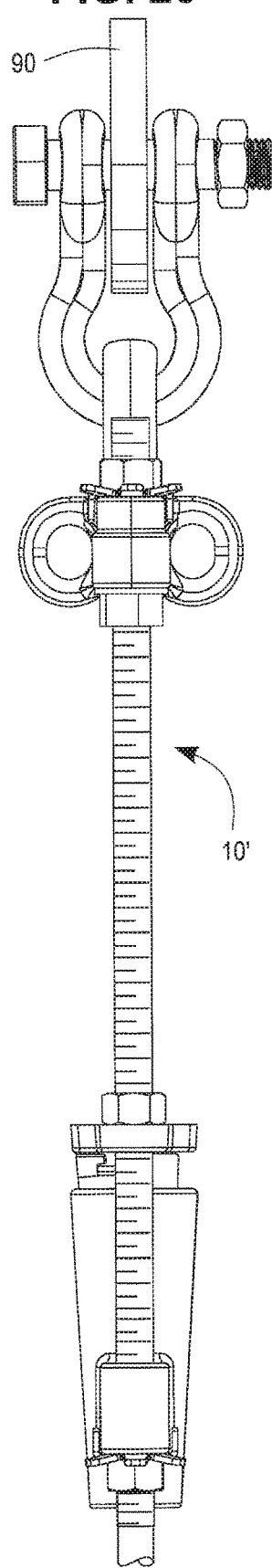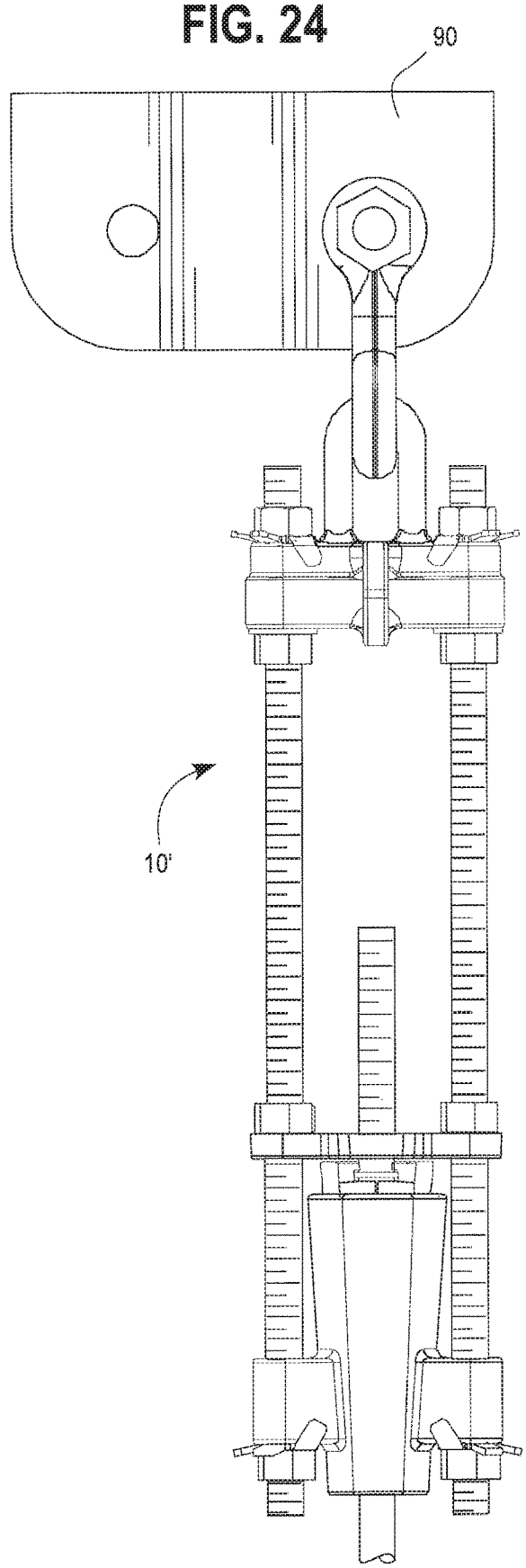

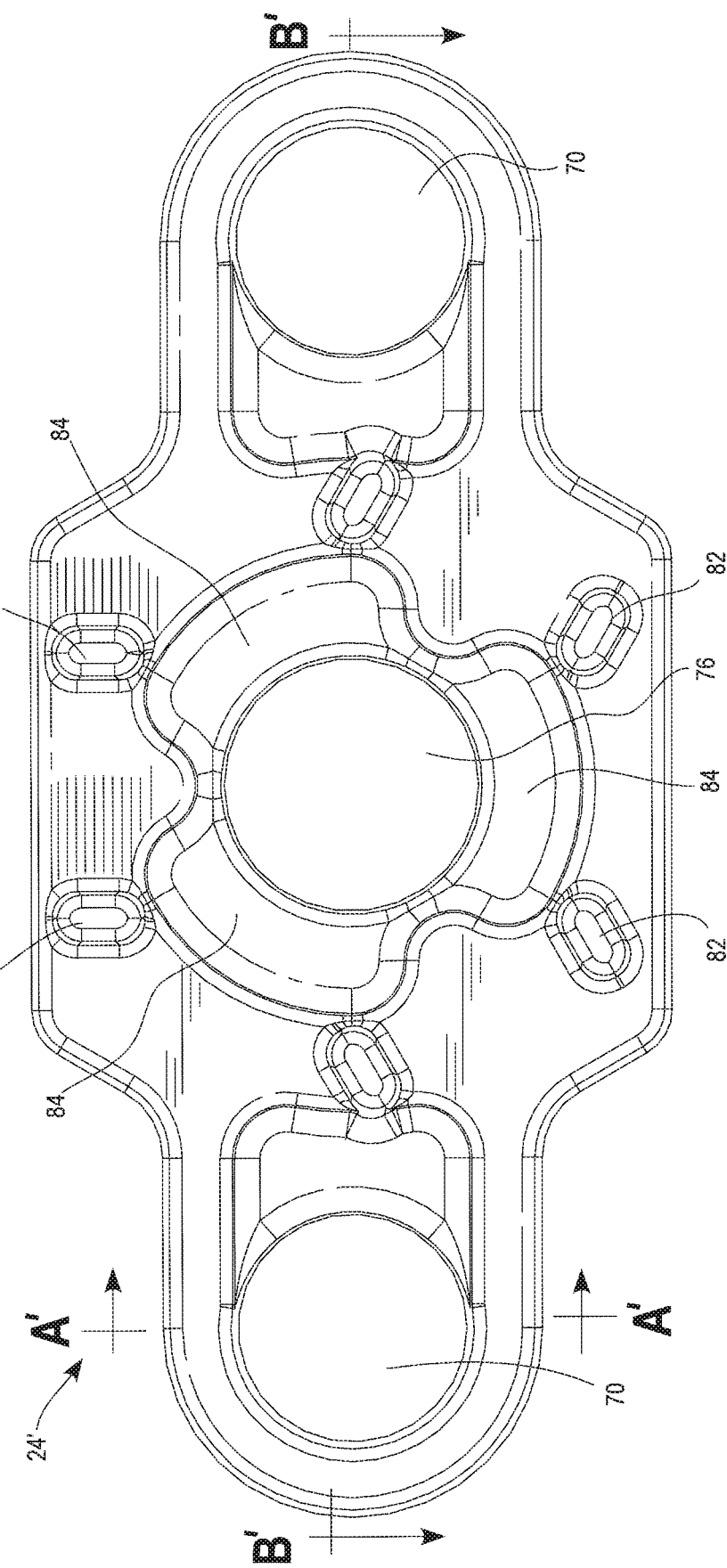

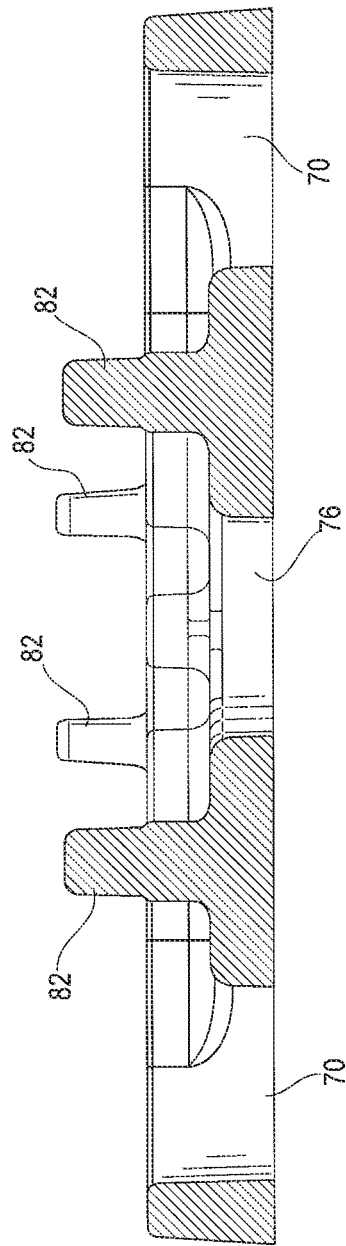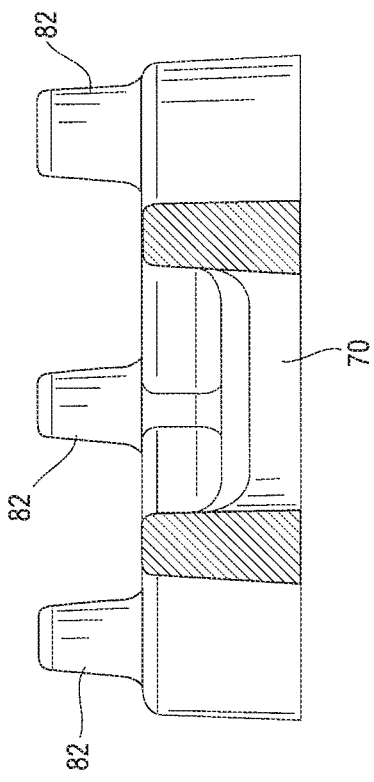

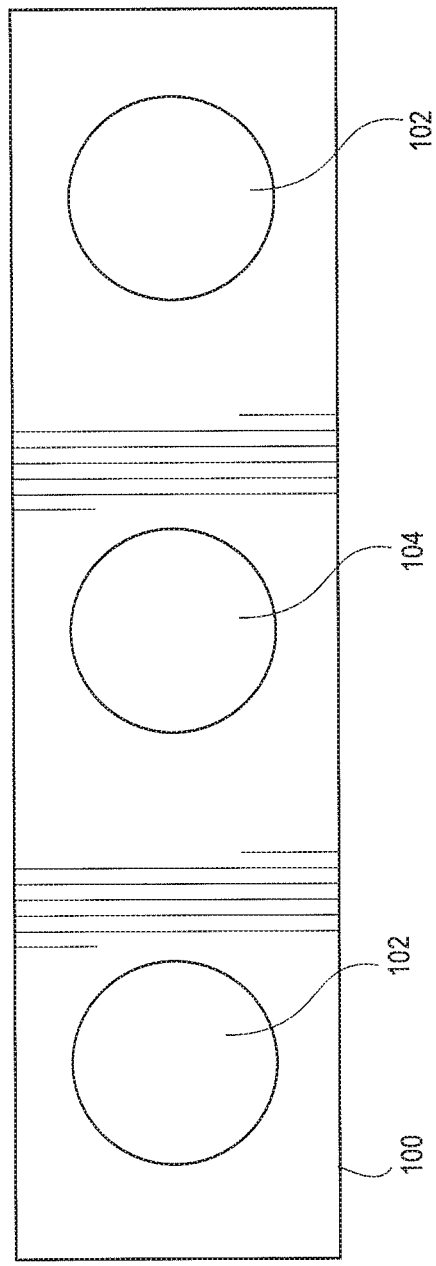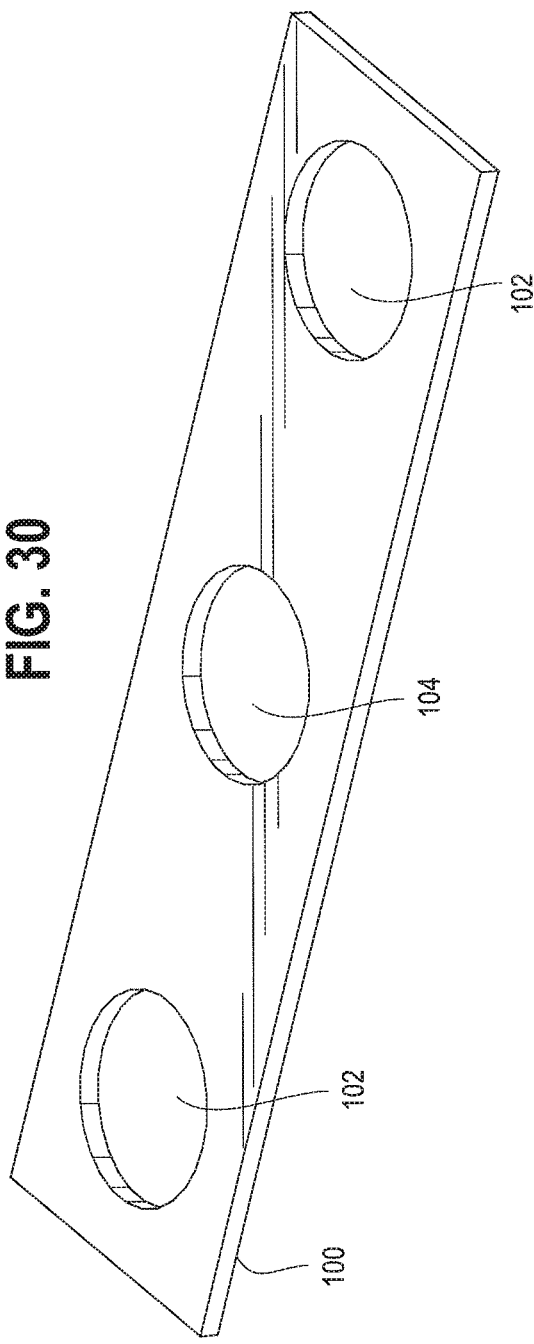

ADJUSTABLE TRANSMISSION GUY LINE CONNECTOR

BACKGROUND

The present disclosure relates generally to guy lines for supporting a tower, and more particularly, to a connector for connecting a guy line to a ground anchor or a tower.

Guy lines are used to support various kinds of towers, such as simple wood poles and metal or wood structures. As is understood by those of skill in the art, a guy line is typically a metal cable made up of a number of helically wound wires. Although various sizes of guy lines are possible, guy lines used for tower supports are commonly ½" to 1¼" in diameter. Typical rated loads for tower support guy lines are about 25,000 pounds minimum for a ½" guy line and about 150,000 maximum for a 1¼" guy line.

A guy line supports a tower by being connected to the tower near the top of the tower or at some intermediate height above the ground. From the top connection to the tower, the guy line extends down toward the ground at an angle away from the tower. At the ground, the guy line is connected to a ground anchor, which may be a metal screw-in anchor, a concrete block or other type of anchor. Thus, when installed, a guy line exerts a downward and outward pull on the tower. In order to fully support a tower, multiple guy lines are typically connected to the tower and ground anchors equally spaced around the tower.

During the installation process for a tower support guy line, the guy line is typically connected to the tower first. The bottom end of the guy line is then connected to the ground anchor, and is then tensioned to a specified load for the particular application. Various types of connectors have been used for connecting the bottom end of a guy line to a ground anchor. However, current guy line connectors are prone to failure at high loads (such as the guy line breaking), are difficult or complicated to install, and/or are expensive to make or use.

SUMMARY

A connector is described for tensioning a guy line and connecting the guy line to a ground anchor or a tower. The connector may include a first body and a second body connected together by two or more threaded rods. The first body is connected to the ground anchor or the tower. The second body has a tapered cavity extending therethrough. The guy line extends through the tapered cavity, and wedges with a first and second inner arcuate surface having different radii are pushed into the tapered cavity. The first arcuate inner surface may hold the guy line prior to being pushed into the tapered cavity, and the second arcuate inner surface may grip the guy line after the wedges have been pushed into the tapered cavity. The first and second bodies may be drawn toward each other to tension the guy line.

BRIEF DESCRIPTION OF SEVERAL VIEWS OF THE DRAWINGS

FIG. 3 is a perspective view of a second body.
FIG. 4 is a front view of the second body.
FIG. 5 is a bottom end view of the second body.
FIG. 9 is a perspective view of the wedge of FIG. 7.
FIG. 10 is an end view of the thinner end of the wedge of FIG. 7.
FIG. 11 is a top view of a washer.
FIG. 12 is a perspective of a wedge driver.
FIG. 14 is a cross-sectional view of the wedge driver along line A-A of FIG. 13.
FIG. 15 is a cross-sectional view of the wedge driver along line B-B of FIG. 13.
FIG. 16 top view of the wedge driver of FIG. 13 with wedges seated thereon.
FIG. 23 is side view of a guy line tower connector.
FIG. 24 is a front view of the tower connector of FIG. 23.
FIG. 26 is a top view of the alternate wedge driver of FIG. 25.
FIG. 27 is a cross-sectional view of the alternate wedge driver of FIG. 25 along line B'-B'.
FIG. 28 is a cross-sectional view of the alternate wedge driver of FIG. 25 along line A'-A'.
FIG. 29 is a top view of a wire helper.
FIG. 30 is a perspective view of the wire helper.

DETAILED DESCRIPTION

Figure 1:
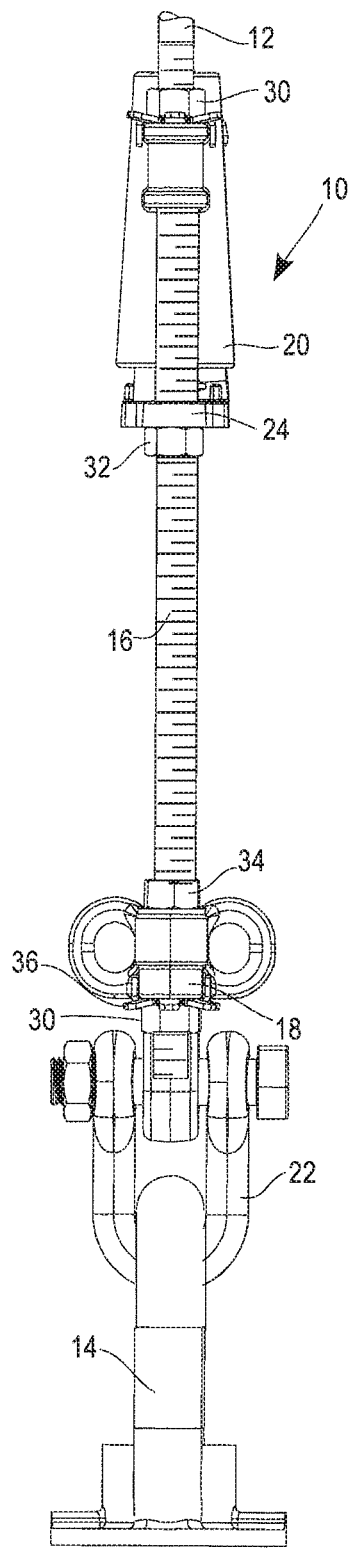
FIG. 1 is a side view of a guy line anchor connector.
Figure 2:
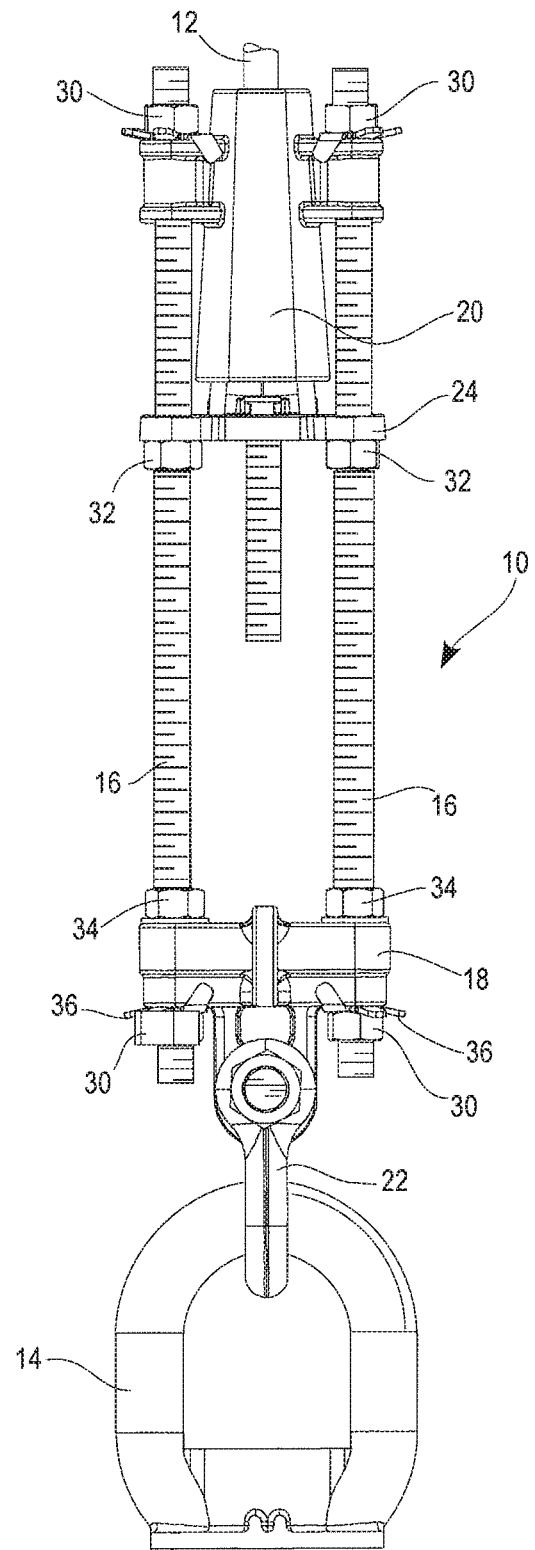
FIG. 2 is a front view of the anchor connector of FIG. 1.

A guy line connector may be used to connect a guy line to a ground anchor or to a tower connection point. Referring now to the figures, and particularly to FIGS. 1-2, a guy line connector 10 is shown. As shown in FIG. 1, the guy line connector 10 is used to connect the guy line 12 to a ground anchor 14. In some configurations, anchor 14 may include may be an eye nut or shackle, and may include an anchor rod (not shown) that may be screwed into the ground. In other configurations, anchor 14 may be bolted or otherwise affixed to a ground support structure. The top end of the guy line 12 may be connected to a tower with a guy line connector, such as the exemplary guy line connector of FIGS. 23-24. The connector 10 may be provided with two or more threaded rods 16 that extend along the length of the connector 10 to connect the first and second bodies 18, 20 together. The first body 18 is located at the first end of the connector 10 and is configured to be connected to the ground anchor 14. As illustrated in FIGS. 1-2, a shackle 22 may be used to connect the first body 18 to the anchor 14. Other types of connections may also be used to connect the first body 18 to the anchor 14. For example, in some configurations, a bolt may be used to connect the first body 18 to the anchor 14. The second body 20 is located at the second end of the connector 10 and is configured to be connected to the guy line 12. A wedge driver 24 may be provided between the first and second bodies 18, 20 to push the wedges 26 (see FIGS. 7-10 and 16-17) into a cavity 28 (see FIG. 6) in the second body 20 as described in further detail below. The first and second bodies 18, 20 and the wedge driver 24 may each extend between the threaded rods 16, with the threaded rods 16 extending through the first and second bodies 18, 20 and the wedge driver 24 to connect them together. As illustrated in FIGS. 1-2, the threaded rods 16 extend parallel to the guy line 12, with the guy line 12 extending at least partially between the threaded rods 16.

The threaded rods 16 may also be provided with nuts 30, 32 to adjust the positions of the first and second bodies 18, 20 and the wedge driver 24 along the length of threaded rods 16. For example, the first nuts 30 may be used to draw the first and second bodies 18, 20 toward each other, which may be used to tension the guy line 12. The second nuts 32 may be used to draw the wedge driver 32 and second body 20 toward each other, which may be used to push the wedges 26 into the cavity 28 of the second body 20 (the top first nuts 30 may also be considered second nuts 32 if used to draw the wedge driver 24 and second body 20 together). Other adjustable nuts 34 may also be provided to secure one or more of the components in place on the threaded rods 16, such as the first body 18 as shown in FIG. 2. Washers 36 may also be provided with the first nuts 30 to prevent the first nuts 30 from loosening after the tension has been set on the guy line 12. Washers 36 may include protruding teeth that extend either radially inward or outward to bite into a bearing surface to prevent a nut or bolt head from loosening, and may also absorb shock or vibration. Alternatively, washers 36 may include a split or bent shape to exert a spring force on a bearing surface to prevent a nut or bolt head from loosening.

Figure 6:
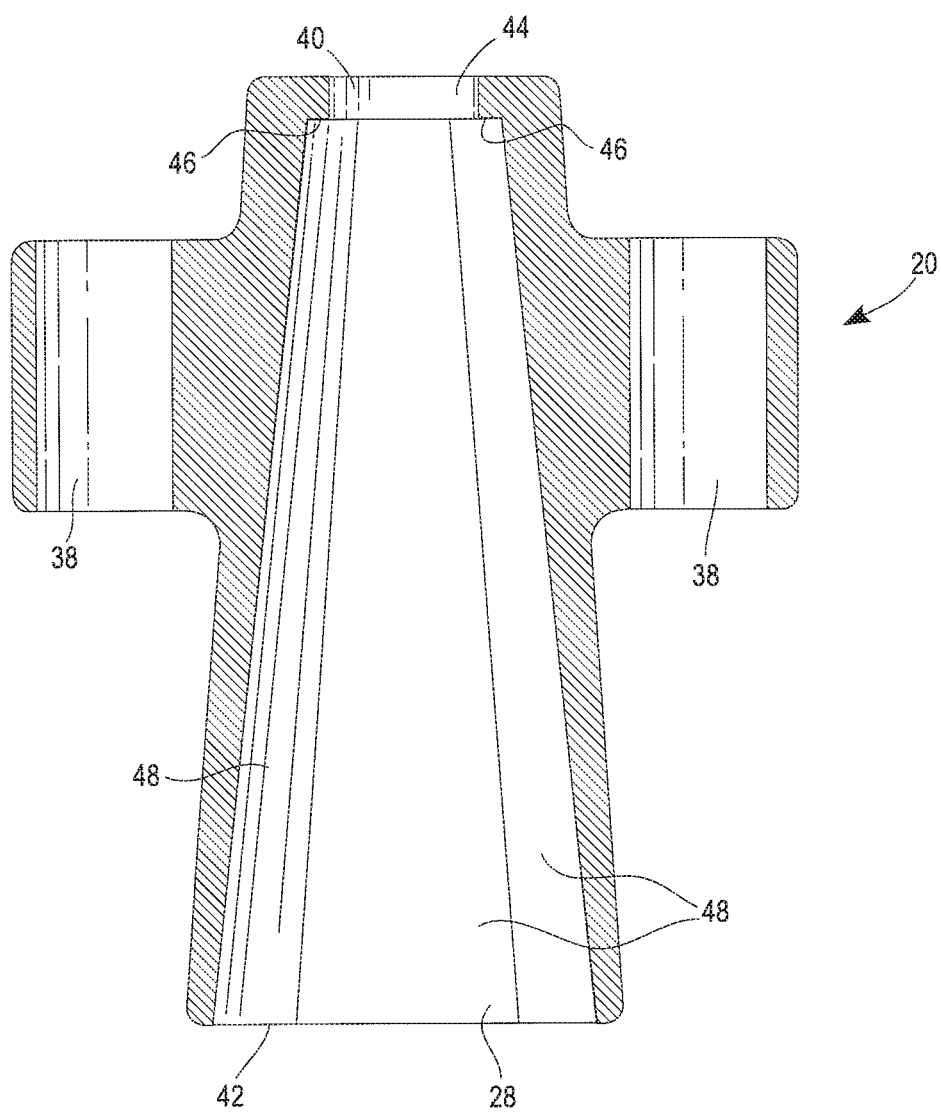
FIG. 6 is a cross-sectional view of a cavity extending through the second body.
Figure 7:
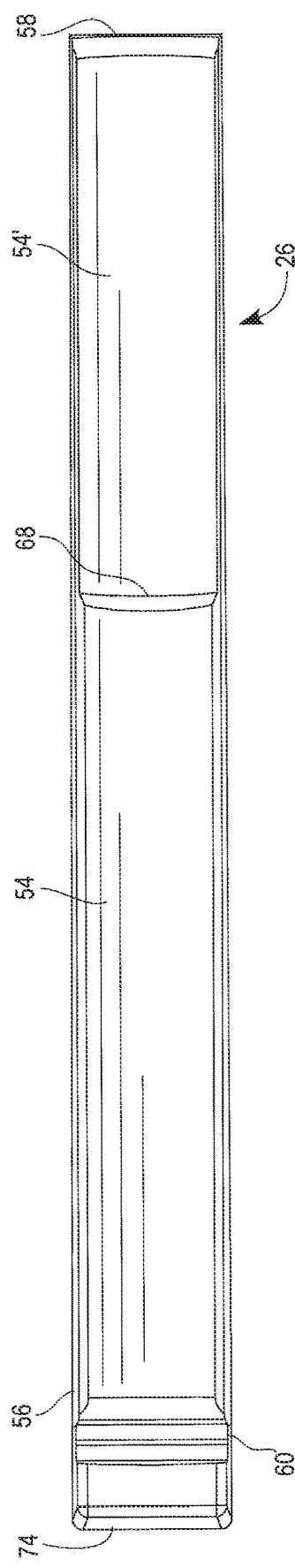
FIG. 7 is a top view of the inner surfaces of a wedge.

Turning to FIGS. 3-6, an example of the second body 20 is shown. The second body 20 may be provided with a pair of holes 38 through which the threaded rods 16 extend. The second body 20 may also be provided with a cavity 28 and a hole 40 that extends through the second body 20 to allow the guy line 12 to extend through the second body 20 and between the threaded rods 16. In some situations, a wax or lubricant may be applied to the inner surfaces of the cavity 28 and/or the hole 40 to aid in receiving the wedges 26 and guy line 12 through the cavity 28 and/or hole 40, respectively. The cavity 28 preferably is tapered from the end 42 facing the first end of the connector 10 to the end 44 directed toward the second end of the connector 10. That is, the cross-sectional area of the cavity 28 is larger at the end 42 closer to the first body 18 and is smaller at the end 44 farther away from the first body 18. As shown in FIG. 6, the cavity 28 may form an opening through the second body 20 at the end 42 facing the first body 18. However, at the other end 44, the second body 20 may be provided with a radially inwardly extending step 46 so that the tapered cavity 28 does not extend all the way through the second body 20 toward the second end. That is, at the small end 44 of the tapered cavity 28, the second body 20 may be provided with a smaller hole 40 that forms the step 46 at the small end 44 of the cavity 28. However, the hole 40 should be large enough for the guy line 12 to pass therethrough. Step 46 further acts as a stop mechanism for wedges 26, thereby not allowing additional force to be placed on the guy line 12 when the wedges 26 reach the step 46.

As shown in FIG. 6, the circumference of the tapered cavity 28 may be formed by a plurality of flat surfaces 48. Thus, the circumference of the cavity 28 may be polygonal along its length. Preferably, the flat surfaces 48 are tapered approximately 3° to approximately 10° from the central axis along their length, and more preferably, about 5°. In order to provide additional strength to prevent the walls of the second body 20 from splitting due to the pressure of the wedges 26, it may be desirable to make the second body 20 out of steel, stainless steel, or cast iron. Thus, it may also be desirable to galvanize the second body 20 to prevent corrosion. However, it may be possible to make the second body 20 out of aluminum if a sufficient grade of aluminum is used and the geometry of the second body 20 is designed with sufficient wall thickness. As shown in FIG. 4, the second body 20 may include an upper portion 56 that extends above side pieces 58 of the second body 20 through which the threaded rods 16 pass. The upper portion 56 helps to reduce stress on the side pieces 58 when the guy line 12 is tensioned between the first body 18 and second body 20, and also increases the adjustable length of the guy line connector 10.

Figure 8:
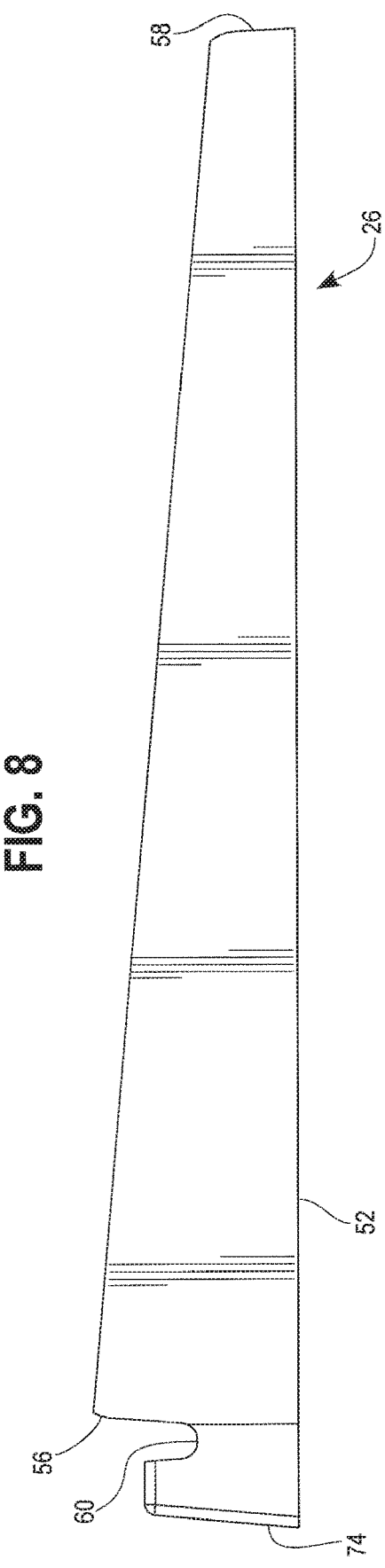
FIG. 8 is a side view of the wedge of FIG. 7.

Turning to FIGS. 7-10, an example of the wedges 26 is shown. Each of the wedges 26 preferably has a flat outer surface 52 that is designed to slide against the flat surfaces 48 of the second body cavity 28. It is further contemplated that each wedge 26 could have an arced outer surface if the cavity of the second body has a generally circular cross-sectional shape. Each wedge 26 may include an inner surface that opposes the flat outer surface 48 of the wedge 26. The inner surface of the wedge may include a double grip, such as a main inner surface 54 and a secondary inner surface 54'. The main inner surface 54 of the wedge 26, may have an arcuate shape that is slightly smaller than the diameter of the guy line 12. The secondary inner surface 54' may have an arcuate shape that is approximately the same as the diameter of the guy line 12. Furthermore, the secondary inner surface 54' may be offset in the vertical direction from the main inner surface 54, such that there is a "step" (68) between the main inner surface 54 and the secondary inner surface 54'. In such a configuration, the secondary inner surface 54' reduces the stress on the ends (58) of the wedges 26 when the guy line 12 is held in position after insertion into the second body 20, thereby reducing the likelihood that the guy line 12 will fail at the wedge end 58. In some configurations, the vertical offset step between the main inner surface 54 and the secondary inner surface 54' may be approximately three-thousandths of an inch. However, it is contemplated that other offset distances may be used without departing from the scope of the disclosure herein. The flat outer surface 52 and the arcuate inner surface (including both the main inner surface 54 and secondary inner surface 54') are preferably angled approximately 3° to approximately 10° from each other, and more preferably, about 5° from each other. As shown in FIGS. 8-9, the thickness of the wedge 26 is greater at the end 56 that will be closer to the first body 18 and is smaller at the end 58 that will be farther from the first body 18.

It is contemplated that the double grip of wedge 26 may have different lengths and/or arc radii. For exemplary purposes, approximate non-limiting different dimensions of the double grip of wedge 26 could be as follows:

| Main Inner Surface Length | Main Inner Surface Radius | Secondary Inner Surface Length | Secondary Inner Surface Radius |
| --- | --- | --- | --- |
| 4.750 inches | 0.485 inches | 0.625 inches | 0.500 inches |
| 6.000 inches | 0.485 inches | 0.375 inches | 0.500 inches |
| 7.750 inches | 0.485 inches | 0.625 inches | 0.500 inches |
| 6.750 inches | 0.485 inches | 1.625 inches | 0.500 inches |
| 6.000 inches | 0.485 inches | 2.375 inches | 0.500 inches |
| 5.000 inches | 0.485 inches | 3.125 inches | 0.500 inches |

As shown in FIGS. 7-10, the wedge 26 may also be provided with a groove 60 that faces the arcuate inner surface 54. As shown in FIG. 16, when multiple wedges 26 are grouped together, a washer 62 (see far example FIG. 17) may be positioned within the grooves 60 of the wedges 26. As a result, the wedges 26 are maintained together and longitudinally aligned by the washer 62 when the wedges 26 move through the cavity 28. In order to allow the guy line 12 to pass unobstructed through the wedges 26, the hole 64 through the washer 62 is preferably large enough to slide over the guy line 12. In addition, the outer diameter 66 of the washer 62 and the grooves 60 are preferably sized to permit the washer 62 to retain the wedges 26 together prior to being compressed by the second body cavity 28 and avoid compressing the washer 62 with the wedges 26 when the wedges 26 are pushed into the second body cavity 28. When multiple wedges 26 are installed together with the washer 62, the combined assembly may be situated in communication with the top side 72 of the wedge driver 24, so that the washer 62 is positioned above a hole 76 in the wedge driver 24 that is configured to receive the guy line 12.

Because the second body 20 will typically be galvanized as explained above, the cavity 28 in the second body 20 will typically have a galvanized coating layer on the flat surfaces 48 of the cavity 28. The thickness of galvanized coating layers frequently varies significantly from part to part, and in the design of the connector 10 described herein, the thickness of the galvanized coating on the flat surfaces 48 of the cavity 28 may affect the amount of compression that is exerted by the wedges 26 on the guy line 12. In some guy line connectors 10, the wedges 26 may be aluminum, iron with mechanical galvanizing, electroplating, or an organic coating. The wedges 26 are also preferably provided with a friction coating on the arcuate inner surface 54 and 54' for gripping the guy line 12, such as aluminum oxide. A friction coating is preferred over serrations or other like features since serrations may damage and weaken the guy line 12.

Figure 13:
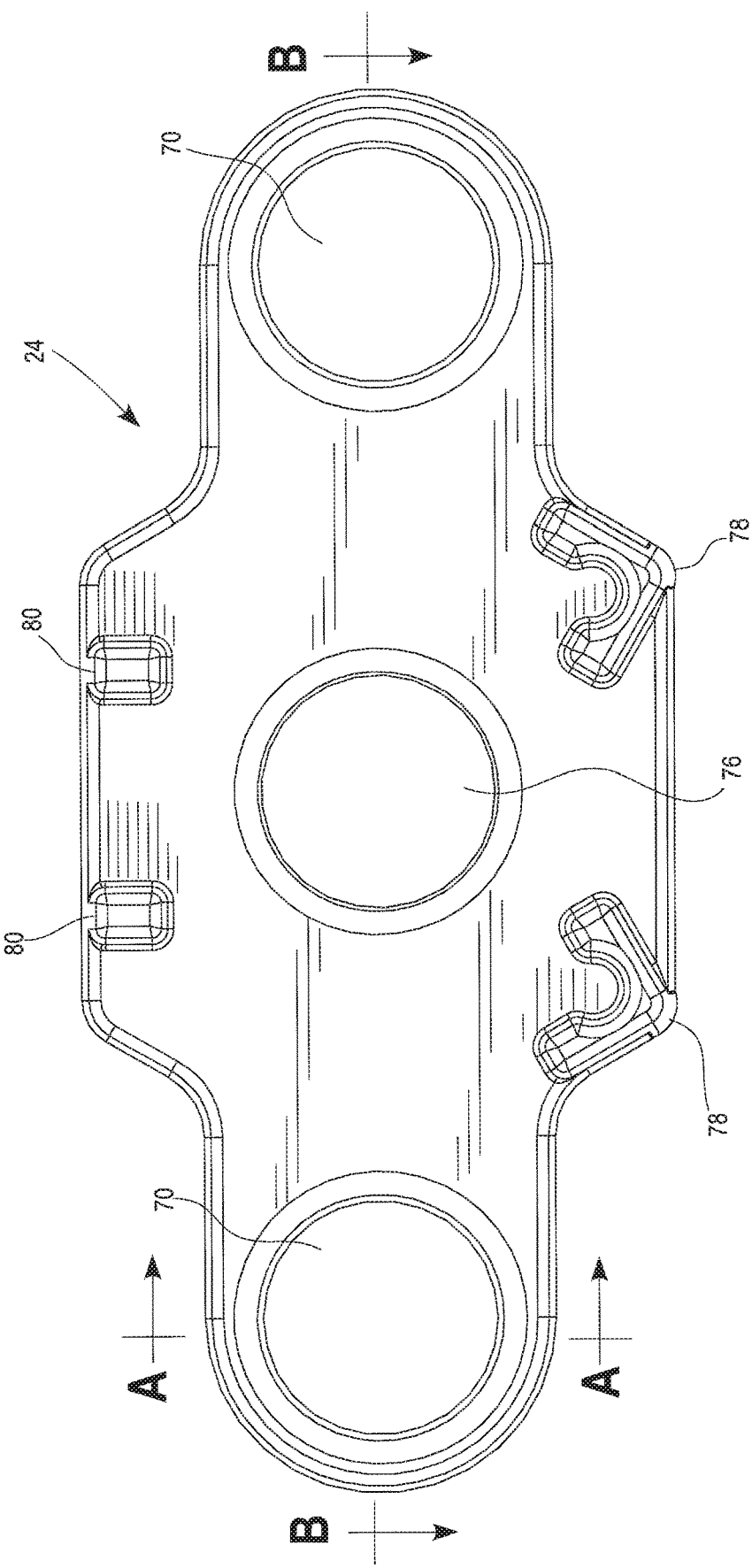
FIG. 13 is a top view of a wedge driver.
Figure 17:
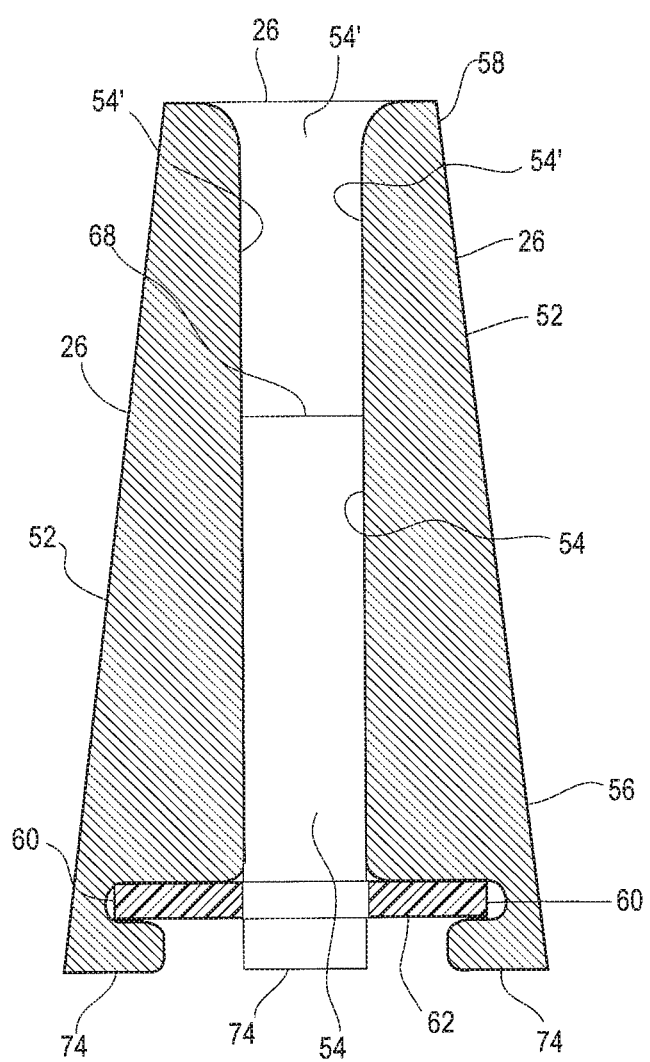
FIG. 17 is a cross-sectional schematic view of the wedges retained together by a washer.
Figure 18:
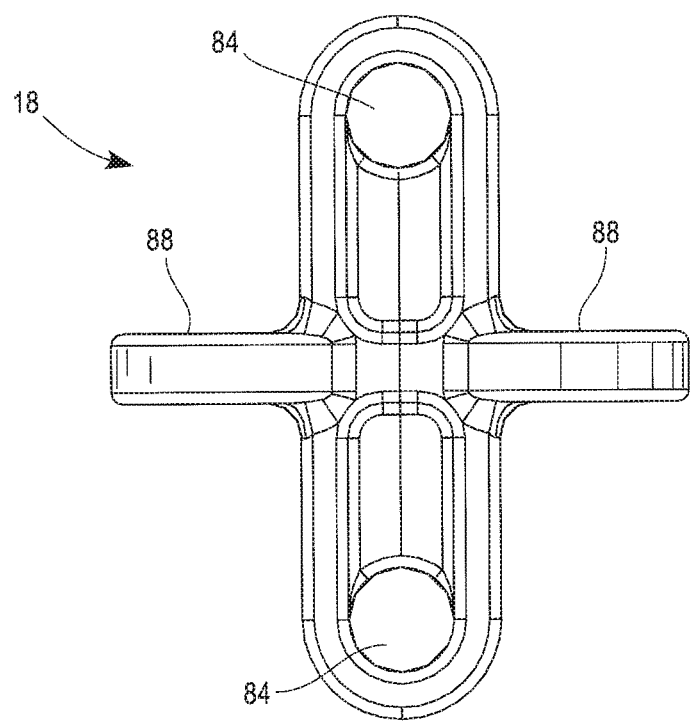
FIG. 18 is a top view of a first body.
Figure 19:
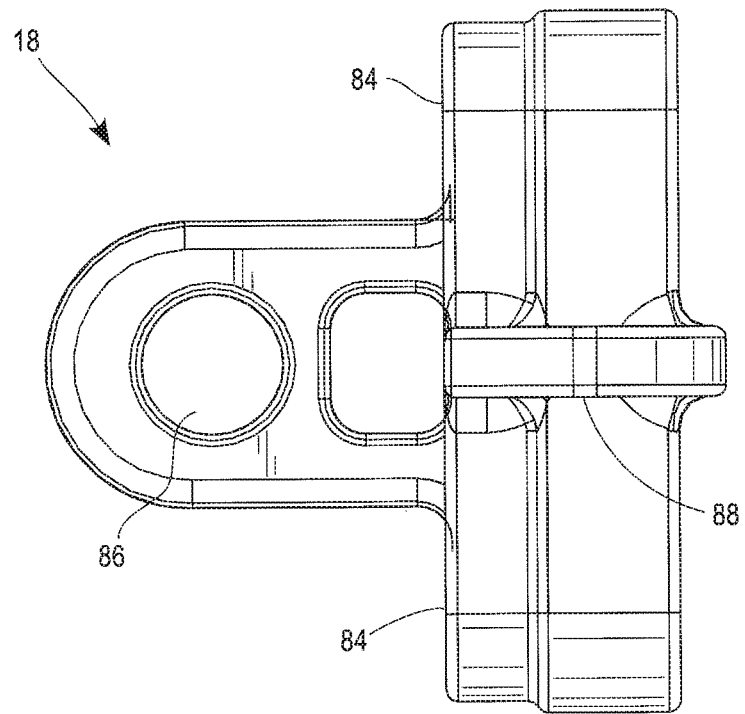
FIG. 19 is a first side view of the first body.
Figure 20:
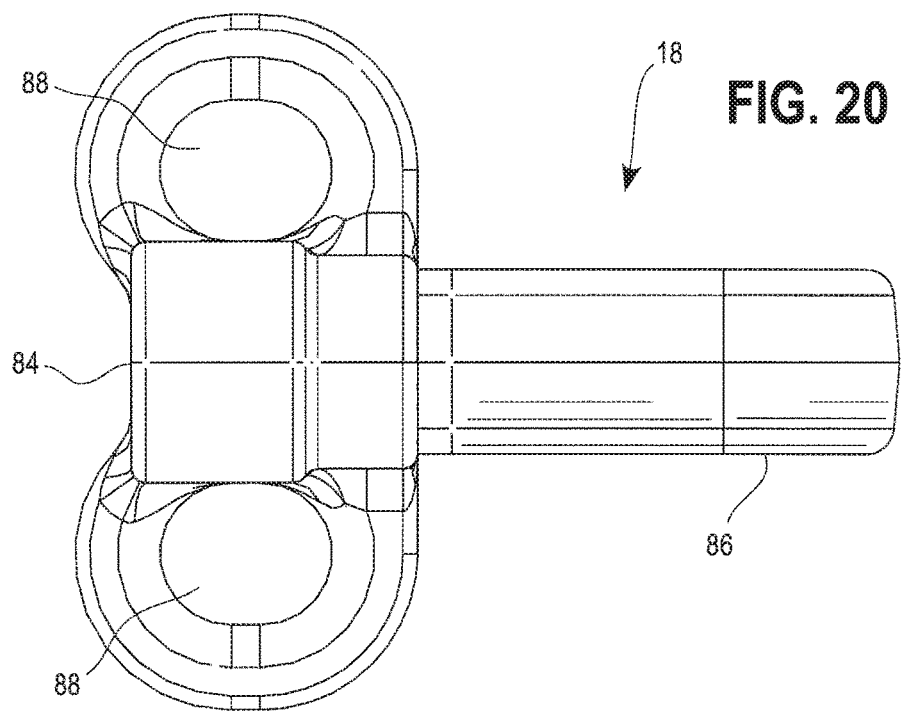
FIG. 20 is a second side view of the first body.
Figure 21:
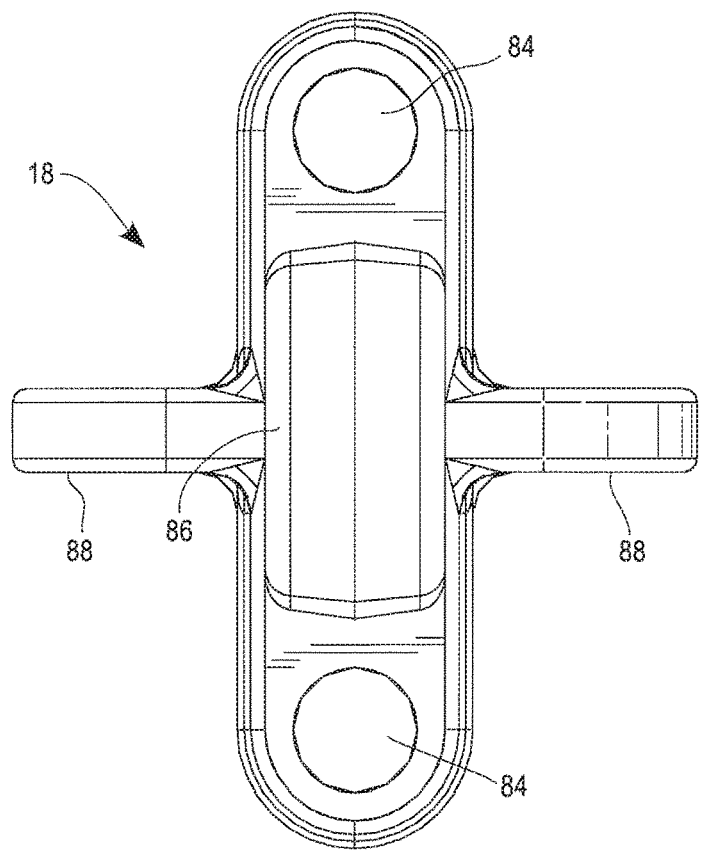
FIG. 21 is a bottom view of the first body.
Figure 22:
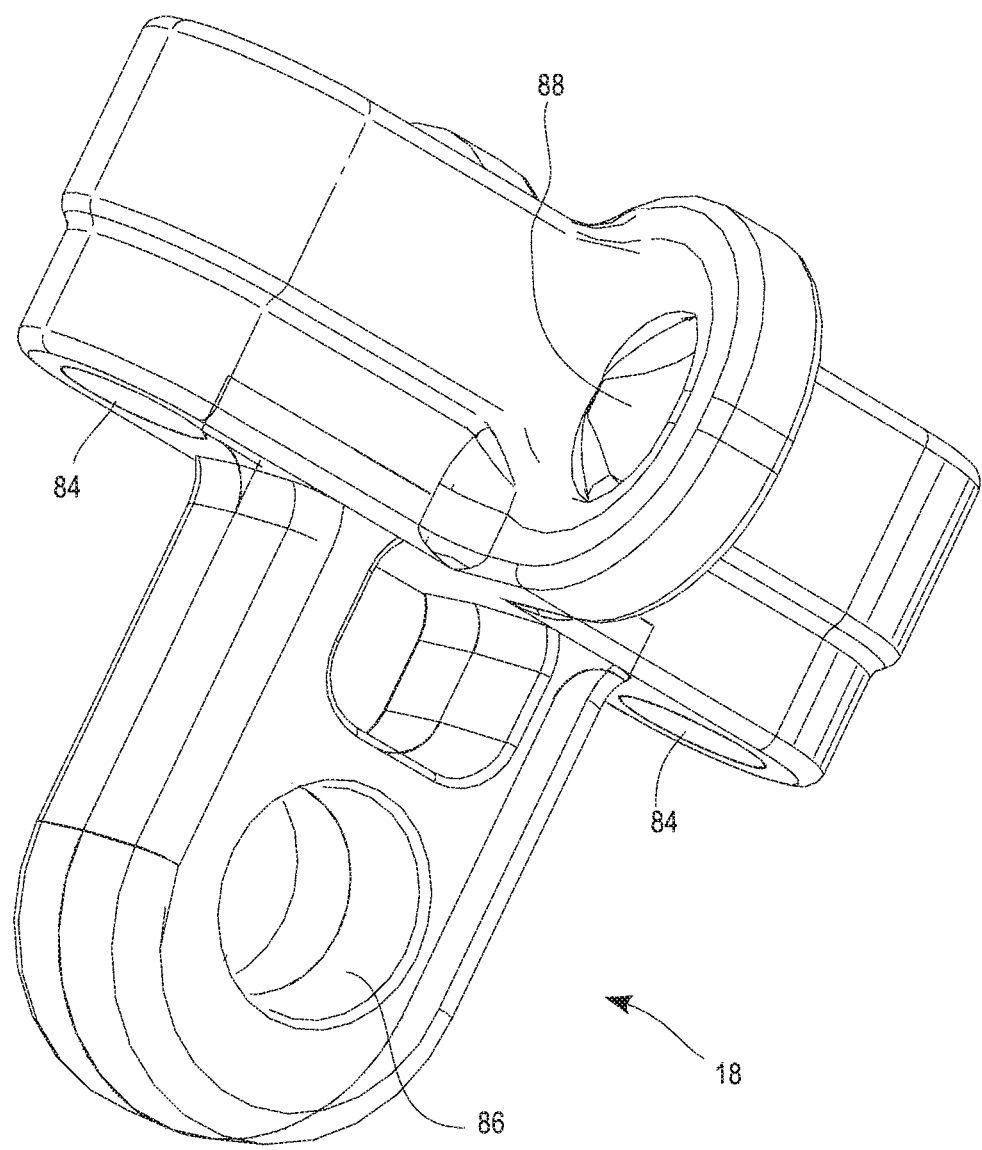
FIG. 22 is a perspective view of the first body.

Turning to FIGS. 12-15, an example of the wedge driver 24 is shown. The wedge driver 24 may be provided with a pair of holes 70 through which the threaded rods 16 extend. The wedge driver 24 is provided with a top surface 72 that contacts the bottom surfaces 74 of the wedges 26 which face toward the first body 18. Thus, when the second nuts 32 are tightened, the wedge driver 24 is drawn toward the second body 20 and the wedges 26 are pushed into the second body cavity 28. The wedge driver 24 is also provided with a hole 76 through which the guy line 12 can extend and slide through. The wedge driver 24 may include multiple first guideposts 78 and multiple second guideposts 80, each of which may be integrally formed with the wedge driver 24. The first and second guideposts 78, 80 may extend vertically away from the top surface 72 of the wedge driver 24. The first guideposts 78 may include multiple legs configured to be joined together to form an angle between one another. A corner portion of a wedge 26, may be received between the legs of the each of the first guideposts 78. As shown in FIG. 13, in some configurations, an arcuate surface may be formed between the legs of each of the first guideposts 78. In other configurations, the legs of each of the first guideposts 78 may be separated by a space. The second guideposts 80 may be spaced apart from one another, and may be configured to receiver a wedge 26 there between. The first and second guideposts 78, 80 may space the wedges 26 circumferentially around the central hole 76 of the wedge driver 24, and may be helpful in aligning the wedges 26 with the flat surfaces 48 of the second body cavity 28. FIG. 13 shows exemplary locations of the wedges 26 in relation to the first and second guideposts 78, 80. FIG. 14 illustrates a cross-sectional view of the wedge driver 24 of FIG. 13 taken along line A-A of FIG. 13. FIG. 15 illustrates a cross-sectional view of the wedge driver 24 of FIG. 13 taken along line B-B of FIG. 13. The wedge driver 24 may be molded aluminum, since a galvanized cast iron or cast steel part would have considerably less precise features. However, stainless steel is also a preferred material for the wedges 26. FIG. 16 is a top view schematic of the wedge driver 24 with wedges 26 seated thereon.

Turning to FIGS. 18-22, an example of the first body 18 is shown. The first body 18 may be provided with a pair of holes 84 through which the threaded rods 16 extend. The first body 18 may also be provided with an eyelet 86 to connect to the anchor 14. In addition, the first body 18 may be provided with one or more eyelets 88 for connecting one end of a winch to the connector 10. As explained further below, the winch may be used during installation of the guy line 12 and the connector 10. The first body 18 may be made of various materials, but galvanized cast iron or cast steel may be preferred.

An example of how an anchor connector 10 may be installed to tension a guy line 12 will now be described. Prior to installing the anchor connector 10, the guy line 12 will typically be connected to the tower and the ground anchor 14 will be set in a suitable fashion for the particular application. A winch may then be connected at one end to the tower or the guy line 12 and at the other end to one of the winching eyes 88 of the first body 18. The winch may then be tightened to tension the guy line 12. This allows the installer to determine the approximate length of the guy line 12 that will be needed, and the installer will typically cut the bottom end of the guy line 12 to an appropriate length. With the bottom end of the guy line 12 extending through the hole 40 and cavity 28 in the second body 20 and the hole 76 in the wedge driver 24, the wedges 26 may then be installed onto the wedge driver 24 and around the guy line 12 using the wedge driver guideposts 78, 80. Preferably, each of the wedges 26 are spaced apart from one another circumferentially so that the wedges 26 do not contact each other. Thus, for example, where the cavity 28 in the second body 20 is hexagonal, three wedges 26 are preferred with the flat surface 52 of each wedge 26 contacting every other flat surface 48 of the cavity 28. Therefore, between each wedge 26 there may be one flat surface 48 of the cavity 28 that does not have a wedge 26 installed thereon.

The wedge driver 24 may be drawn toward the second body 20 by tightening the second nuts 32 to push the wedges 26 into the cavity 28. Due to the tapered angle of the cavity 28, this also forces the wedges 26 radially inward so that the arcuate main inner surface 54 and the secondary main inner surface 54' of the wedges 26 engage the guy line 12 by squeezing against the guy line 12. However, because the secondary main inner surface 54' is vertically offset (68) from the main inner surface 54, it limits the stress at the end (58) of the wedges 26 against the guy line 12, and thereby allows an increased load to be applied to the guy line connector 10 and the guy line 12 when compared to a uniformly (i.e., non-stepped) configured wedge. Because the wedges 26 are also tapered to match the taper of the cavity 28, the arcuate main inner surfaces 54 are oriented parallel to the guy line 12 so that the arcuate main inner surfaces 54 and secondary main inner surfaces 54' contact the guy line 12 uniformly along their length. As the wedges 26 are pushed into the cavity 28 by the wedge driver 24, the wedges 26 compress against the guy line 12. Preferably, a predetermined torque will be applied to the wedge driver 24 so that a suitable amount of compression is applied to the guy line 12.

During use, tension on the guy line 12 may typically vary as wind or other loads are applied to the tower. One problem that some wedge grip designs suffer from is that the compression force applied by the wedges to the line are not uniform along the length of the wedges. In particular, with wedges with an arcuate outer surface engaging a conical cavity, the wedges tend to squeeze with greater compression force near the tip of the wedges (i.e., the thinner ends). This can result in necking of the line near the tips of wedges and results in a weak point that is more prone to failure. However, in the connector 10 described herein, the flat outer surfaces 52 of the wedges 26 and the corresponding flat surfaces 48 of the cavity 28 may result in more uniform compression along the length of the wedges 26 and less necking problems. In addition, when the maximum tension on the guy line 12 is reached, the wedges 26 are stopped by the step 46 in the cavity 28. This may occur due to the ends 58 of the wedges 26 contacting the step 46 or in some cases due to the ends 58 contacting a radius or other transition between cavity 28 and the step 46. Once the wedges 26 are stopped by the step 46, the wedges 26 are prevented from compressing against the guy line 12 any further since no further axial movement of the wedges 26 is permitted. This also limits the amount of compression and necking that can occur at the wedges 26 in order to prevent a weak point in the guy line 12 from forming.

While the above paragraphs describing an exemplary manner of how the guy line anchor connector 10 may be installed to tension a guy line 12, a similar process may be followed to connector a guy line tower connector 10' to a tower. FIGS. 23 and 24 illustrate a tower connector 10'. The tower connector 10' may include the similar components described in this disclosure with respect to anchor connector 10. However, rather than being connected to an anchor, a first body of the tower connector 10' would be connected to a tower connection point, such as tower plate 90.

Figure 25:
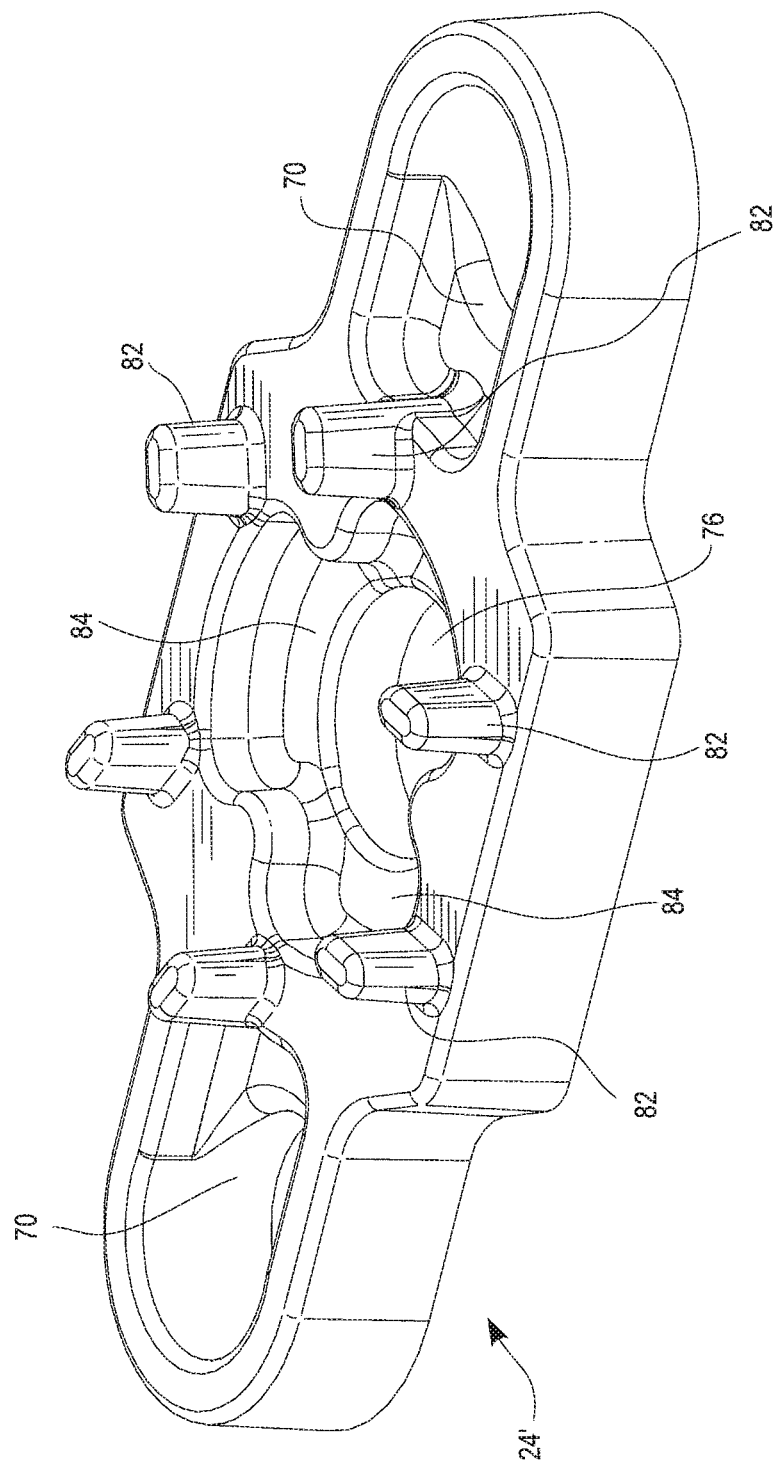
FIG. 25 is a perspective view of an alternate wedge driver.

FIGS. 25-28 illustrate an alternate wedge driver 24'. The wedge driver 24' includes, as described with respect to FIG. 12-15, similar pairs of holes 70 through which threaded rods 16 may extend, and hole 76 through which the guy line 12 can extend and slide through. As shown in FIGS. 25-26, alternate wedge driver 24' a plurality of guideposts 82 spaced at equal distances around hole 76. These plurality of may extend upward away from a top surface 72' of wedge driver 24' any may aid in maintaining the positioning of wedges when used in conjunction with wedge driver 24'. Additionally, wedge driver 24' includes a plurality of recesses 84 that are set below the top surface 72' of wedge driver 24'. The plurality of recesses 84 may be spaced at equal distances around hole 76, and may be shaped to correspond to a bottom surface of wedges used in conjunction with wedge driver 24'. Each of the plurality of recesses 84 includes a interior wall surface integrally formed in wedge driver 24' that aids in maintaining the orientation of wedges used in conjunction with wedge driver 24'.

Figure 31:
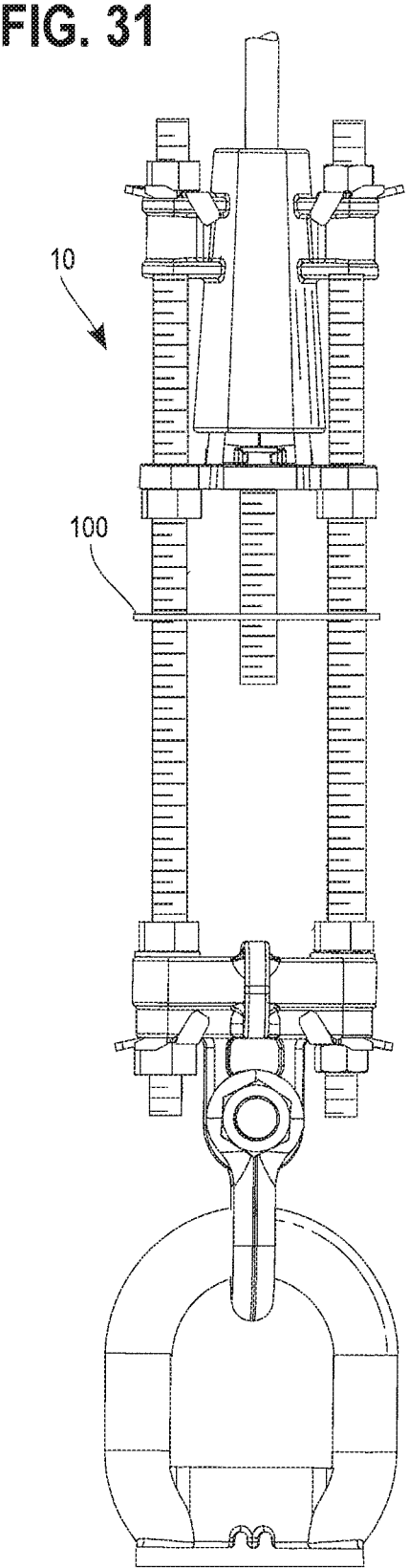
FIG. 31 is a front view of an anchor connector with a wire helper.
Figure 32:
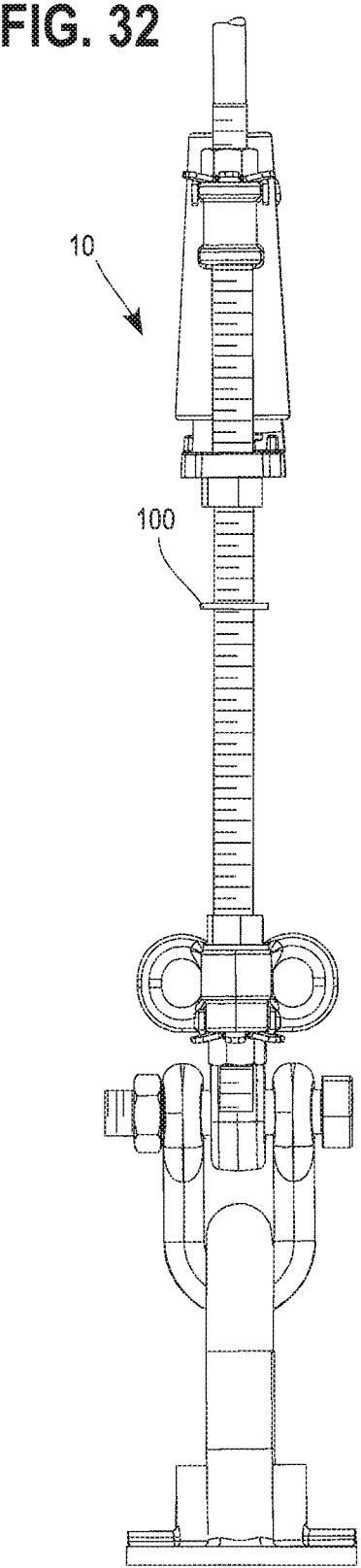
FIG. 32 is a side view of the anchor connector of FIG. 31 with a wire helper.

FIGS. 29 and 30 depict a wire helper 100. Wire helper 100 may be a steel, stainless steel, or cast iron plate, and may include a pair of holes 102 through which the thread rods 16 of a guy line connector (10 or 10') extend. Wire helper 100 may also include a third hole 104 that may receive the end of the guy line 12 that extends through the second body 20 of the guy line connector (10 or 10'). As shown in FIGS. 31 and 32, the wire helper 100 may be positioned between the first body 18 and the second body 20. The third hole 104 of the wire helper 100 may be positioned near the center of the wire helper 100, and configured to hold the portion of the guy line 12 that extends through the second body 20 in a generally straighter configuration than the guy line 12 may be without use of a wire helper 100. An advantage to maintaining the guy line 12 in a straighter configuration is that it allows the wedges 26 to more easily fit into the second body 20 than if the guy line 12 were allowed to bend.

While FIGS. 31 and 32 depict a guy line anchor connector 10 with a wire helper 90, it is contemplated that wire helper 90 could also be used in connection with a guy line tower connector, for example the connector 10' depicted in FIGS. 23 and 24.

Figure 33:
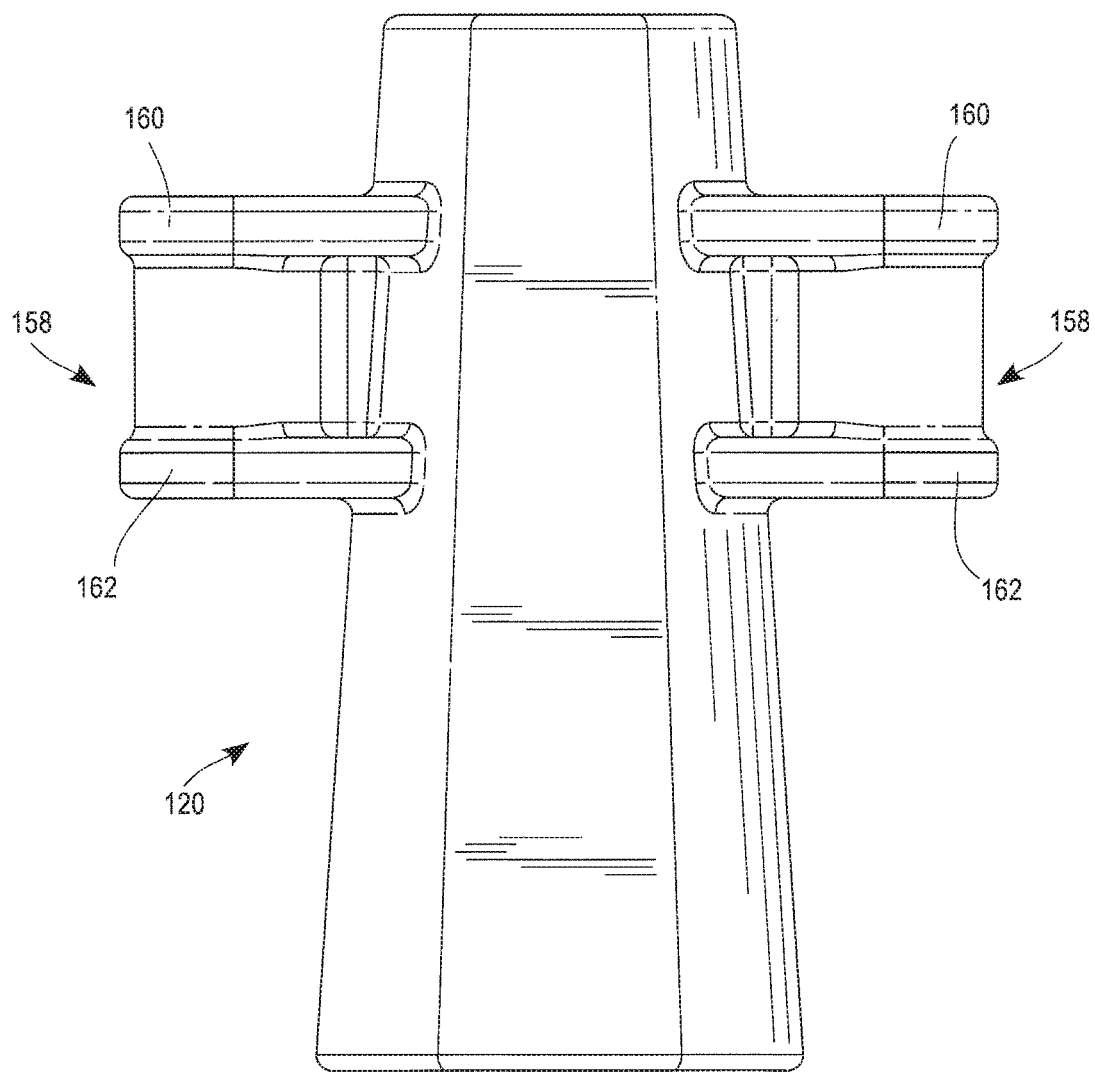
FIG. 33 is a front view of an alternate second body.
Figure 34:
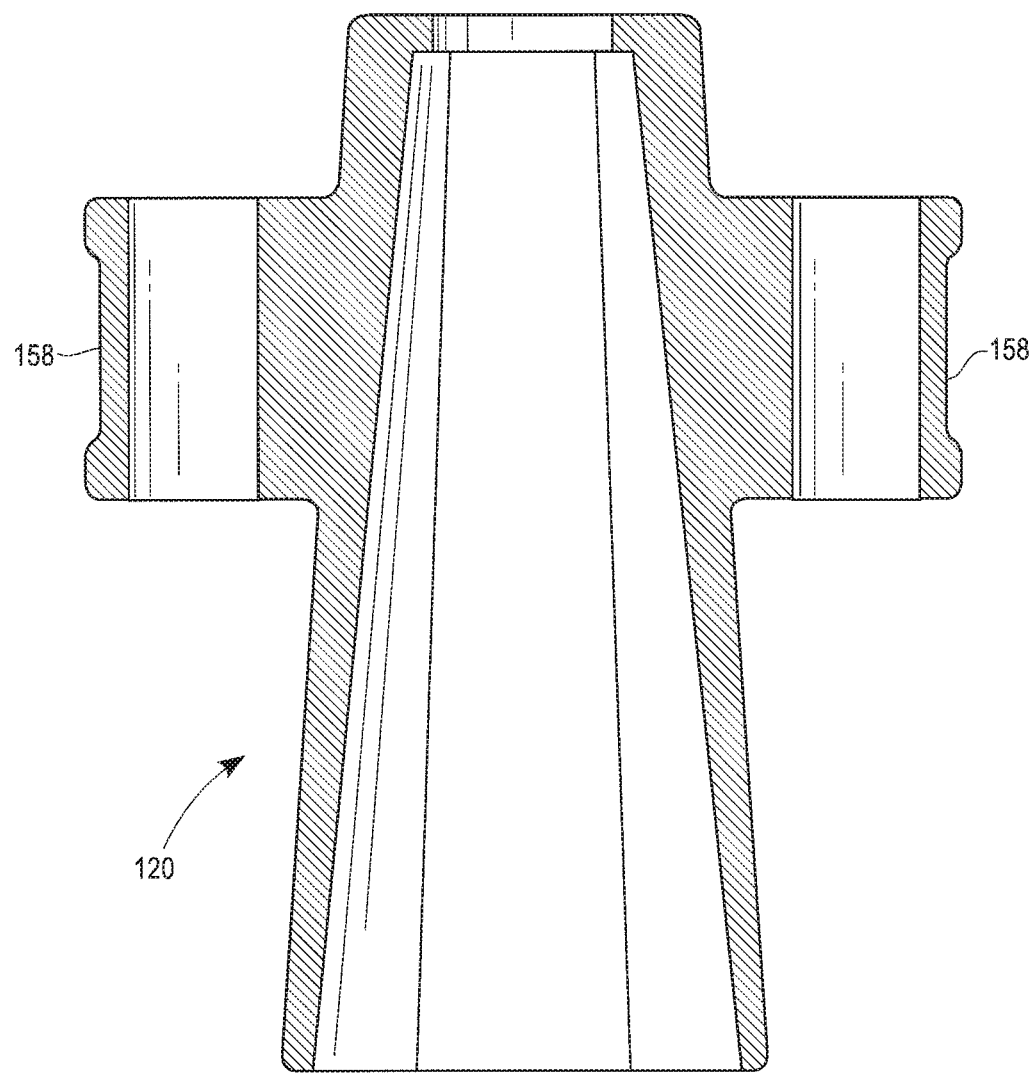
FIG. 34 is a cross-sectional view of a cavity extending through the alternate second body of FIG. 33.

FIG. 33 is a front view of an example of an alternate second body 120 that could be used with guy line connectors 10 or 10'. The alternate second body 120 may be include a similar configuration as to the second body 20 described above, with the exception that the side piece 158 of the alternate second body 120 are configured with upper and lower ridges 160 such that an exterior middle portion 162 portion of the side pieces 158 includes less material. The mechanical operation of the alternate second body 120 is similar to the second body 20 described above, but the alternate second body 120 will weigh less and cost less as a result of the reduction of material at side pieces 158.

While preferred embodiments of the guy line connector have been described, it should be understood that changes in form and details may be made without departing from the spirit and scope of the disclosure. It should also be understood that the scope of the inventions disclosed herein are defined by the appended claims, and all devices and methods that come within the meaning of the claims, either literally or by equivalence, are intended to be embraced therein.

The invention claimed is:

1. A connector for connecting a guy line to an anchor, comprising:
   a first end configured to be connected to an anchor;
   a second end configured to be connected to a guy line;
   a middle portion connecting the first end and the second end together;
   the first end comprising a cavity through which the guy line extends, a plurality of flat surfaces being disposed around a circumference of the cavity, and the flat surfaces being tapered from a larger cavity cross-section disposed toward the first end to a smaller cavity cross-section disposed away from the first end; and
   a plurality of wedges disposed within the cavity, each of the wedges comprising a flat outer surface engaged with one of the flat surfaces of the cavity, a first arcuate inner surface and a second arcuate inner surface engagable with the guy line, wherein the first arcuate inner surface and the second arcuate inner surface are vertically offset from one another, and wherein axially movement of the wedges through the cavity toward the second end compresses the second arcuate inner surface against the guy line.

2. The connector according to claim 1, wherein the first end further comprises a step at one end of the cavity, the step being disposed toward the second end and away from the first end, and the step extending inward from at least one of the flat surfaces of the cavity to stop axially movement of the wedges through the cavity toward the second end.

3. The connector according to claim 1, further comprising a wedge driver contacting a surface of each of the wedges facing toward the first end, the wedge driver pushing the wedges through the cavity.

4. The connector according to claim 3, wherein the wedge driver comprises a plurality of guideposts spacing each of the wedges circumferentially from each other and aligning the wedges with the flat surfaces of the cavity.

5. The connector according to claim 3, wherein the wedge driver comprises a first guidepost configured to receive a corner of one of the wedges to circumferentially position the one of the wedges around a central hole of the wedge driver.

6. The connector according to claim 5, wherein the wedge driver further comprises a pair of second guideposts, wherein the pair of second guideposts are spaced apart from one another and configured to receive a second of the wedges therebetween to circumferentially position the second of the wedges around a central hole of the wedge driver.

7. The connector according to claim 1, wherein the middle portion comprises two threaded rods, the first end comprising a first body extending between the threaded rods, and the second end comprising a second body extending between the threaded rods, the cavity extending through the second body and being disposed between the threaded rods, the threaded rods extending parallel to the guy line and the guy line extending between the threaded rods, and further comprising a first nut on each of the threaded rods, tightening of the first nuts drawing the first and second bodies toward each other to tension the guy line.

8. The connector according to claim 7, further comprising a wedge driver contacting a surface of each of the wedges facing toward the first end, the wedge driver pushing the wedges through the cavity wherein the wedge driver extends between the threaded rods, and further comprising a second nut on each of the threaded rods, tightening of the second nuts drawing the wedge driver and the second body toward each other to push the wedges through the cavity.

9. The connector according to claim 1, further comprising a winching eye configured to connect one end of a winch to the connector and another end of the winch being connected to the guy line or a tower to which the guy line is connected.

10. The connector according to claim 1, wherein the flat surfaces of the cavity and the wedges are tapered about 3° to about 10° from a central axis.

11. The connector according to claim 1, wherein each of the wedges comprises a groove facing the first and second arcuate inner surfaces, and further comprising a washer with a hole sized to slide over the guy line and an outer diameter disposed within the grooves of the wedges, the washer maintaining the wedges in longitudinally alignment as the wedges move through the cavity.

12. The connector according to claim 11, wherein the flat surfaces of the cavity and the wedges are tapered about 3° to about 10° from a central axis, and each of the wedges comprises a groove facing the first and second arcuate inner surfaces, and further comprising a washer with a hole sized to slide over the guy line and an outer diameter disposed within the grooves of the wedges, the washer maintaining the wedges in longitudinally alignment as the wedges move through the cavity.

13. The connector according to claim 12, wherein the second body is galvanized, the wedges are made from aluminum or stainless steel, and each of the wedges comprises a friction coating on the first and second arcuate inner surface.

14. The connector according to claim 1, wherein the wedges are made from aluminum or stainless steel.

15. The connector according to claim 14, wherein the middle portion comprises two threaded rods, the first end comprising a first body extending between the threaded rods, and the second end comprising a second body extending between the threaded rods, the cavity extending through the second body and being disposed between the threaded rods, the threaded rods extending parallel to the guy line and the guy line extending between the threaded rods, and further comprising a first nut on each of the threaded rods, tightening of the first nuts drawing the first and second bodies toward each other to tension the guy line.

16. A connector for connecting a guy line to an anchor, comprising:
   a first body configured to be connected to an anchor;
   a second body configured to be connected to a guy line;
   two threaded rods connecting the first body and the second body together, the first and second bodies extending between the threaded rods, the threaded rods extending parallel to the guy line and the guy line extending between the threaded rods;
   a first nut disposed on each of the threaded rods, tightening of the first nuts drawing the first and second bodies toward each other to tension the guy line;
   the first body comprising a cavity extending therethrough through which the guy line extends, the cavity being tapered from a larger cavity cross-section disposed toward the first body to a smaller cavity cross-section disposed away from the first body, and the cavity being disposed between the threaded rods;
   a plurality of wedges disposed within the cavity, each of the wedges comprising an outer surface engaged with the cavity and multiple arcuate inner surfaces vertically offset from one another and that are engageable with the guy line, wherein axially movement of the wedges through the cavity toward the second end compresses the wedges against the guy line; and
   a wedge driver contacting a surface of each of the wedges facing toward the first body, the wedge driver extending between the threaded rods, and further comprising a second nut disposed on each of the threaded rods, tightening of the second nuts drawing the wedge driver and the second body toward each other to push the wedges through the cavity.

17. A connector for connecting a guy line to an anchor, comprising:
   a connector body having a cavity through which the guy line extends, the cavity tapered from a larger cavity cross-section to a smaller cavity cross-section; and
   a plurality of wedges disposed within the cavity, each of the wedges having an outer surface engaged with the cavity, a first inner surface and a second inner surface engagable with the guy line, wherein the first inner surface and the second inner surface are vertically offset from one another, and wherein axially movement of the wedges through the cavity compresses the second inner surface against the guy line.

18. The connector according to claim 17, further comprising:
   a first body configured to be connected to an anchor;
   at least one threaded rod connecting the first body and the connector body together, the threaded rod extending parallel to the guy line.

19. The connector according to claim 18, further comprising a wedge driver contacting a surface of each of the wedges, the wedge driver pushing the wedges through the cavity.

20. The connector according to claim 19, further comprising a first nut on the threaded rod, wherein tightening of the first nut drawing the first body and connector body toward each other to tension the guy line.

21. The connector according to claim 20, further comprising a second nut on the threaded rod, tightening of the second nut drawing the wedge driver and the connector body toward each other to push the wedges through the cavity.

22. The connector according to claim 17, wherein each of the wedges has inner surfaces being arcuate.

* * * * *